United States Patent [19]

Yamada et al.

[11] Patent Number: 5,585,440
[45] Date of Patent: Dec. 17, 1996

[54] RUBBER COMPOSITION FOR GOLF BALLS

[75] Inventors: Mikio Yamada, Kobe; Yoshikazu Yabuki; Seiichiro Endo, both of Akashi, all of Japan

[73] Assignee: Sumitomo Rubber Industries, Ltd., Hyogo-ken, Japan

[21] Appl. No.: 170,769

[22] Filed: Dec. 21, 1993

[30] Foreign Application Priority Data

Dec. 25, 1992 [JP] Japan ................................ 4-358347

[51] Int. Cl.$^6$ ................ C08L 9/00; C08L 7/00; C08J 3/24; A63B 37/06
[52] U.S. Cl. ............. 525/193; 525/236; 260/998.14; 524/908; 524/526; 473/372; 473/367; 473/357
[58] Field of Search ................. 525/236, 1.93; 260/998.14; 524/908

[56] References Cited

U.S. PATENT DOCUMENTS

| | | |
|---|---|---|
| 4,433,107 | 2/1984 | Takeuchi et al. . |
| 4,683,257 | 7/1987 | Kakiuchi et al. . |
| 4,878,431 | 11/1989 | Herring .................... 102/290 |
| 4,882,394 | 11/1989 | Kreiner ................... 525/332.7 |
| 4,929,678 | 5/1990 | Hamada et al. . |
| 4,955,613 | 9/1990 | Gendreau et al. . |
| 4,955,966 | 9/1990 | Yuki et al. . |
| 4,974,852 | 12/1990 | Hiraoka et al. . |
| 5,082,285 | 1/1992 | Hamad et al. . |
| 5,096,201 | 3/1992 | Egashira et al. . |
| 5,131,662 | 7/1992 | Pollitt . |
| 5,215,308 | 6/1993 | Hiraoka et al. . |
| 5,252,652 | 10/1993 | Egashira et al. ............ 524/289 |

FOREIGN PATENT DOCUMENTS

| | | |
|---|---|---|
| 653056 | 12/1962 | Canada . |
| 60-94434 | 5/1985 | Japan . |
| 1122571 | 10/1965 | United Kingdom . |
| 2205105 | 11/1988 | United Kingdom . |

*Primary Examiner*—Carman J. Seccuro, Jr.
*Attorney, Agent, or Firm*—Birch, Stewart, Kolasch & Birch, LLP

[57] ABSTRACT

The present invention provides a rubber composition having high impact residence, preferred processability and workability which may be used for the manufacture of one-piece solid golf ball, solid core of multi-layered solid golf ball, solid center of thread-wound golf ball, etc. The rubber composition is characterized by that a rubber component is made from a mixture of:

(1) 60 to 95 wt % of a polybutadiene containing at least more than 40% of cis-1,4 bond and having a Mooney viscosity [$ML_{1+4}$(100° C.)] of 50 to 70, obtained by using lanthanum rare earth-based catalyst, nickel-based catalyst or cobalt-based catalyst, or a mixture thereof with another polybutadiene obtained by using a catalyst other than the above mentioned one, and (2) 5 to 40 wt % of a polyisoprene containing at least more than 90% of cis-1,4 bond and a Mooney viscosity of 70 to 90.

9 Claims, No Drawings

RUBBER COMPOSITION FOR GOLF BALLS

FIELD OF THE INVENTION

The present invention relates to a rubber composition for golf balls. In particular, the present invention relates to a rubber composition used for manufacture of one-piece solid golf balls, solid cores of multi-layered solid golf balls (such as, two-piece solid golf balls and three-piece solid golf balls etc.) and solid centers of thread-wound golf balls.

BACKGROUND OF THE INVENTION

Conventionally, as a rubber component for a rubber composition used for manufacture of one-piece solid golf balls, solid cores of multi-layered solid golf balls (such as, two-piece solid golf balls, three-piece solid golf balls) or solid centers of thread-wound golf balls, a polybutadiene containing more than 40% of cis-1, 4 bond and having a Mooney viscosity [$ML_{1+4}(100°\ C.)$] of less than 50, obtained by using lanthanum rare earth-based catalyst, nickel-based catalyst or cobalt-based catalyst, has been employed. This is because the polybutadiene has good workability in mixing operation using a roller, a kneader or a banbury mixer (for instance, U.S. Pat. No. 4,955,613, Japanese Kokai Publication Hei 2-80068, Japanese Kokai Publication Hei 4-109971, Japanese Kokai Publication Hei 3-151985, Japanese Kokai Publication Hei 4-73072, U.S. Pat. 5,215,308 etc.).

However, when the polybutadiene of low viscosity is used, there has been such problem that high impact resilience is difficult to obtain and consequently the golf ball with higher initial speed or higher flying distance can not be obtained.

Thus, in order to obtain a rubber composition which provides high impact resilience, it has been proposed to use a rubber having higher Mooney viscosity or higher molecular weight (for instance, Japanese Kokai Publication Sho 63-275356, Japanese Kokai Publication Sho 62-89750, Japanese Kokai Publication Hei 3-106380, Japanese Kokai Publication Hei 3-151985, etc.).

However, the use of the rubber having higher viscosity or higher molecular weight adversely gives rise to such a problem as deterioration of processability or workability. Consequently, to prevent the deterioration of processability or workability, it is also proposed to blend a rubber having lower Mooney viscosity with the rubber with higher Mooney viscosity or to blend a liquid rubber with the rubber with higher Mooney viscosity (for instance, Japanese Kokai Publication Hei 4-73072, U.S. Pat. No. 5,215,308).

These rubber compositions for golf balls are mixed by a roller, a kneader, a banbury mixer, etc. and then extruded by an extruder, followed by cutting to an appropriate size to obtain plugs for compression molding, which is used for one-piece solid golf balls, solid cores of two-piece golf balls, solid cores of three-piece golf balls, solid centers of thread-wound golf balls, etc.

For instance, in case of a rubber composition used for producing one-piece solid golf balls, it is made into cylindrical plugs having a diameter of about 32±3 mm and a weight of 48±2 g. In case of a rubber composition used for producing solid cores of two-piece solid golf balls, it is made into cylindrical plugs of about 29±2 mm in diameter and 38±2 g. In case of a rubber composition used for producing solid cores of three-piece solid golf balls or for producing solid centers of thread-wound golf balls, it is made into plugs with elliptic oval shape having about 38 mm in length, about 23 mm in width and about 21 mm in thickness.

The plugs thus obtained are usually dipped in a solution of an anti-sticking agent so that the plugs do not stick with each other and after drying, they are aged for about 8 to 48 hrs. The plugs are then charged in the respective metal mold and press-molded under heat-compression.

However, if a polybutadiene with higher Mooney viscosity is used in this process, the resulting rubber composition has poor mixing ability and poor roll workability, and provides plugs having rough surface when extruded, often showing a surface like a pinecone. When press-molded after dipping the plugs in the solution of anti-sticking agent, the anti-sticking agent enters into a gap formed before vulcanization and remains there. When the plugs are press-molded, the gap does not close and results in small creases on the surface. In the worst case, it gives cracks which cause breaking of golf balls.

Besides, in order to stabilize vulcanization, it is necessary to conduct storage the plugs after kneading and extruding and before press-molding, wherein the plugs have to be stored in a dehumidified storage chamber at a constant temperature usually for about 8 to 48 hrs, as mentioned above. However, the cis-polybutadiene tends to cause cold flow and during storage, the plugs may collapse and deform from the shape before storage, resulting in deterioration of workability when press-molding.

SUMMARY OF THE INVENTION

The objective of the present invention is to solve such problems as above which are inherent to the process of prior art and to provide a rubber composition for golf balls, having improved processability and workability and providing higher impact resilience. Particularly, the rubber composition of the present invention also provides good extrusion characteristics and anti-cold flow characteristics which have not been much attended so far.

The present invention provides a rubber composition for golf balls characterized by that a rubber component of the rubber composition is made from a mixture of:

(1) 60 to 95 wt % of a polybutadiene containing at least more than 40% of cis-1,4 bond and having a Mooney viscosity [$ML_{1+4}(100°\ C.)$] of 50 to 70, obtained by using lanthanum rare earth-based catalyst, nickel-based catalyst or cobalt-based catalyst, or a mixture thereof with another polybutadiene obtained by using a catalyst other than the above mentioned one, and (2) 5 to 40% wt % of a polyisoprene containing at least more than 90% of cis-1,4 bond and a Mooney viscosity [$ML_{1+4}(100°\ C.)$] of 70 to 90.

In other words, in the case of the rubber composition of the present invention, a high impact resilience is secured by using the polybutadiene (1) which contains more than at least 40% of cis-1,4 bond and has Mooney viscosity [$ML_{1+4}(100°\ C.)$] of 50 to 70 which is higher than those of the conventional compositions, at such high ratio as 60 to 95 wt %. And the problems of inferior processability and workability at the time of kneading, extrusion and press-molding and inferior anti-cold flow property during storage due to the use of polybutadiene of high Mooney viscosity are solved by co-using the polyisoprene (2) which contains more than at least 90% of cis-1,4 bond and has Mooney viscosity [$ML_{1+4}(100°\ C.)$] of 70 to 90 at the specific ratio of 5 to 40 wt %.

A point where the rubber composition of the present invention is significantly different from the conventional rubber composition used for golf balls is that, with the conventional rubber composition, a polybutadiene having lower Mooney viscosity or a liquid rubber having lower viscosity is blended into the polybutadiene having higher Mooney viscosity, whereas in case of the rubber composition of the present invention, the polybutadiene having higher Mooney viscosity is blended with the polyisoprene which has Mooney viscosity even higher than the polybutadiene, and thereby the processability, workability and anti-cold flow property of the rubber composition are significantly improved without deteriorating high impact resilience thereof.

DETAILED DESCRIPTION OF THE INVENTION

The rubber composition of the present invention may be used for manufacture of one-piece solid golf balls, solid cores of multi-layered solid golf balls (such as, two-piece solid golf ball, three-piece solid golf ball etc.) or solid centers of thread-wound golf balls. The composition may generally comprises, in addition to the above rubber component, a crosslinking agent, a filler, a peroxide initiator and if necessary an antioxidant. The crosslinking agent may be a metal salt of an α,β-ethylenically unsaturated carboxylic acid or a combination of an α,β-ethylenically unsaturated carboxylic acid and a metal oxide (e.g. zinc oxide). If the composition is vulcanized by way of sulfur, the rubber composition may comprises sulfur and a vulcanization accelerator, and if necessary an auxiliary vulcanization accelerator, instead of the co-crosslinking agent and the peroxide.

In the present invention, it is necessary that the polybutadiene (1) contains more than 40% of cis-1,4 bond, preferably more than 80% of cis-1,4 bond and that Mooney viscosity [$ML_{1+4}(100°\ C.)$] thereof is 50 to 70, preferably 55 to 65.

When the content of cis-1,4 bond is less than 40%, high impact resilience is not obtained and also when Mooney viscosity is less than 50, high impact resilience is not obtained, while when Mooney viscosity is higher than 70, processability and workability deteriorate and such problem can not be sufficiently eliminated even when the polyisoprene (2) is co-used.

The polybutadiene (1) is obtained by using lanthanum rare earth-based catalyst, nickel-based catalyst or cobalt-based catalyst. The polybutadiene obtained by using nickel-based catalyst or cobalt-based catalyst may be those conventionally used in this field and it is not required to be a special product.

The polybutadiene obtained by using lanthanum rare earth-based catalyst is usually synthesized by polymerizing butadiene in the presence of a catalyst comprising a combination of a lanthanum rare earth-compound, an organic aluminum compound, a Lewis base and, upon necessity, a Lewis acid. The lanthanum rare earth-compound may be a compound containing a rare earth atom (atom number of 57 to 71), but particularly preferred is a neodymium compound.

In the polymerization, solvent may be used or bulk polymerization may be conducted without using the solvent. A polymerization temperature may be normally −30° to 150° C., preferably 10° to 80° C. and a polymerization pressure may be changed properly according to other conditions.

The concrete examples of polybutadiene (1) containing at least more than 40% of cis-1,4 bond and having a Mooney viscosity [$ML_{1+4}(100°\ C.)$] of 50 to 70 may be, for example, "Butene 1207" (tradename) manufactured by Goodyear Chemical Corp., "Buna CB22" (tradename) or "Buna CB23" (tradename) manufactured by Bayer A.G., prototype product of Japan Synthetic Rubber Co. (super-high molecular weight polybutadiene with Mooney viscosity [$ML_{1+4}(100°\ C.)$] of 60 obtained by laboratory synthesis using nickel-based catalyst, method of polymerization being the same as that for JSR BR11 (tradename Hi-cis polybutadiene), and an average molecular weight being $15\times10^4$) etc.

In the present invention, the cis-1,4-polybutadiene (1) is used with the polyisoprene (2). The polyisoprene (2) is so-called cis-polyisoprene and it is required to contain at least more than 90% of cis-1,4 bond and to have Mooney viscosity [$ML_{1+4}(100°\ C.)$] of 70 to 90. When a Mooney viscosity is lower than 70, impact resilience decreases, roll workability deteriorates and anti-cold flow property deteriorates whereas when it is higher than 90, blending with cis-1,4-polybutadiene (1) becomes difficult and inferior dispersion is resulted.

The concrete example of the polyisoprene containing more than 90% of cis-1,4-bond and having a Mooney viscosity [$ML_{1+4}(100°\ C.)$] of 70 to 90 may be, for example, "IR-2200" (tradename) manufactured by Nippon Zeon Co., Ltd., "JSR IR-2200" (tradename) of Japan Synthetic Rubber Co., "KURAPRENE IR-10" (tradename) manufactured by Kuraray Co., Ltd. etc.

As for the mixture of polybutadiene (1) and the polyisoprene (2) of the rubber composition of the present invention, the ratio of the two components is required to be 60 to 95 wt % for polybutadiene (1) and 5 to 40 wt % for polyisoprene 2), and particularly it is preferred to be 75 to 95 wt % for polybutadiene (1) and 5 to 25 wt % for polyisoprene (2).

When the ratio of the polybutadiene (1) is less than 60%, impact resilience is not sufficient and consequently initial velocity, flying distance etc. of the ball are insufficient whereas when the ratio of the polybutadiene (1) is more than 95 wt %, processability and workability at the time of kneading, extrusion, press-molding etc. and anti-cold flow property during storage become inferior.

In the present invention, the mixture of polybutadiene (1) and polyisoprene (2) is used as the rubber component as aforesaid, but it is unnecessary to blend them beforehand. They may be mixed at the specified blending ratio at the time of preparation of the rubber composition. In case where the polybutadiene (1) is a mixture of the polybutadiene prepared by using the specific catalyst and another polybutadiene, they may be mixed at the specific blending ratio at the time of preparation of the rubber composition, as mentioned above.

The rubber composition of the present invention may be used, as mentioned above, for manufacture of one piece solid golf balls, for manufacture of solid cores of multi-layered solid golf balls (such as, two-piece solid golf balls, three-piece solid golf balls) or for manufacture of solid centers of thread-wound golf balls.

In the preparation of the golf ball, vulcanization method to be employed may be crosslinked by way of α,β-ethylenically unsaturated carboxylic acid-based crosslinking agent or by way of sulfur. Vulcanization by α,β-ethylenically unsaturated carboxylic acid-based crosslinking agent may be applied to the manufacture of one-piece solid golf ball, the manufacture of the solid core of multi-layered solid golf ball (such as, two piece solid golf ball, three-piece solid golf ball etc.) or to the manufacture of the solid center of thread-wound golf ball.

Vulcanization by sulfur is suitable for the manufacture of the solid center of thread-wound golf ball or the manufacture of the solid core of three-piece solid golf ball.

When the α,β-ethylenically unsaturated carboxylic acid-based crosslinking agent is used, a metal salt of α,β-ethylenically unsaturated carboxylic acid may be directly formulated into the rubber composition. Or an α,β-ethylenically unsaturated carboxylic acid and a metal oxide (e.g. zinc oxide) may be formulated into the rubber composition and the metal salt of the α,β-ethylenically unsaturated carboxylic acid may be prepared in the rubber composition by the reaction thereof during the preparation of the rubber composition.

The α,β-ethylenically unsaturated carboxylic acid includes acrylic acid, methacrylic acid etc., and the metal salt thereof includes zinc acrylate and zinc methacrylate. For the metal oxide to be used in the production of metal salt of said α,β-ethylenically unsaturated carboxylic acid from α,β-ethylenically unsaturated carboxylic acid and metal oxide during the preparation of rubber composition, zinc oxide is preferred.

When the α,β-ethylenically unsaturated carboxylic acid based crosslinking agent is used, a peroxide is used as an initiator. Examples of the peroxides are dicumyl peroxide, 1,1-di-t-butylperoxy-3,3-5-trimethylcyclohexane, 2,5-dimethyl-2,5-di-(t-buthylperoxy)hexane, 1,3-bis (t-butylperoxyisopropyl)benzene, etc.

When vulcanization is conducted by way of sulfur, a vulcanization accelerator may be formulated into the rubber composition. Upon necessity, an auxiliary vulcanization accelerator may also be formulated. The vulcanization accelerator may be, for example, CZ (N-cyclohexyl-2-benzothiazylsulfeneamide), TT (tetramethylthiuram disulfide), TS (tetramethylthiuram monosulfide), MOR (N-oxydiethylene-2-benzothiazolylsulfeneamide) etc. and the auxiliary vulcanization accelerator may be stearic acid, zinc stearate etc.

Whether it is crosslinked by α,β-ethylenically unsaturated carboxylic acid-based crosslinking agent or vulcanized by sulfur, filler is formulated into the rubber composition. The filler may be zinc oxide, barium sulfate, calcium carbonate, silica, etc.

An amount of these primary components is not particularly restricted but the preferred ratio may be for 100 wt parts of the rubber component composed of the mixture of the polybutadiene (1) and polyisoprene (2), 5 to 60 wt parts of metal salt of α,β-ethylenically unsaturated carboxylic acid (or 5 to 60 wt parts of α,β-ethylenically unsaturated carboxylic acid and 5 to 60 wt parts of metal oxide), 2 to 300 wt parts of filler and 0.1 to 10 wt parts of peroxide.

When sulfur vulcanization is conducted, it is preferred to formulate 1 to 30 wt parts of sulfur and 0.1 to 5 wt parts of vulcanization accelerator, in place of the metal salt of α,β-ethylenically unsaturated carboxylic acid (or α,β-ethylenically unsaturated carboxylic acid and metal oxide) and peroxide.

Using the rubber composition of the present invention, a solid core of a two-piece solid golf ball or a three- piece solid golf ball is prepared. A solid center of a thread-wound golf ball is formed and then rubber thread is wound around the solid center to form a thread-wound core. It is necessary to cover the core with a cover. The cover generally is formed from ionomer resin.

A thickness of the cover is properly determined and it is not particularly restricted but it is preferred to be in the range of 0.5 to 3 mm. When the thread-wound core is covered, the material mainly made of balata (transpolyisoprene) may be used for the cover material.

The manufacture of one-piece solid golf ball, solid core of multi-layered solid golf ball such as two-piece solid golf ball, three piece solid golf ball etc. solid center of thread-wound golf ball using the rubber composition of the present invention may be conducted in the same manner as in the conventional method.

To describe the method taking the solid core of two-piece solid golf ball as an example, the material with the composition suitable for the solid core of two-piece golf ball is mixed by a mixing machine such as a banbury mixer, a kneader, a roller, etc. to prepare a rubber composition. The resulting composition is extruded in rod form by an extruder, and the extruded molding is cut to obtain plugs or alternatively the composition is spread into a thick board and then is stamped out to produce plugs.

The obtained plugs are put in a metal mold for a core and press-molded under heat-compression. The temperature used at this time is usually 135° to 180° C. and duration of compression is preferred to be 10 to 50 minutes.

The pressure is sufficient if the metal mold does not open during press-molding. It is also possible to form the mixed rubber composition into a thin and narrow ribbon form which can be molded into cores by injection molding.

By press-molding or by injection molding under heat compression, the rubber composition is vulcanized to obtain elasticity. When the α,β-ethylenically unsaturated carboxylic acid-based crosslinking agent is used, no crosslink by sulfur actually occurs and therefore the correct expression is crosslinking but in this specification, the case of crosslinking by α,β-ethylenically unsaturated carboxylic acid-based crosslinking agent is sometimes called vulcanization according to customary practice.

The method to cover the core with a cover is not particularly limited but it may be the method to envelop the core with a pair of cover material each formed into a semispherical shell beforehand and the two half shells are made into one piece by heat-compression molding or made into one piece by directly injection molding the cover material around the core.

To blend polyisoprene into polybutadiene has not necessarily been totally unreported in a literature but the practices of such blending reported have been for other purposes or for the purposes undefined or they lack sometimes the detailed description of Mooney viscosity. For instance, the Examples of Japanese Kokai Publication Hei 4-10997 introduces the blending of Butadiene BR-01 (tradename) manufactured by Japan Synthetic Rubber Co. with Mooney viscosity [$ML_{1+4}$(100° C.)] of 43 and Polyisoprene Natsyn 2200 (tradename) manufactured by Goodyear Tire Co. with Mooney viscosity [$ML_{1+4}$(100° C.)] of 82 but this Example is for the objective of obtaining the solid golf ball having both a specific feeling and longer flying distance which is different from the objective of the present invention and the range of viscosity is also different.

Japanese Kokai Publication Hei 2-297384 introduces an example wherein a mixture of polybutadiene with unknown Mooney viscosity and polyisoprene with unknown Mooney viscosity is formulated with metal salt of unsaturated carboxylic acid, organic sulfur compound and/or organic sulfur compound containing metal but this example aims mainly at an improvement of initial speed of the ball (i.e., improvement of impact resilience) by formulating the sulfur compound and besides no reference is made to the Mooney viscosity of the rubber to be used.

Japanese Kokai Publication Sho 63-212377, Japanese Kokai Publication Sho 63-2200889 etc. also propose to properly blend polybutadiene with polyisoprene, natural rubber (natural polyisoprene) or styrene-butadiene etc.

However, these proposals do not clearly indicate the purpose of blending of natural rubber etc. and besides they lack the description of Mooney viscosity. Usually when natural rubber is used, it is used after reducing the Mooney viscosity to around 50 by a softening agent as the processability of natural rubber itself is inferior.

As the result as indicated in the Comparative Example 5, the workability is adversely affected or anti-cold flow property deteriorates.

Rubber composition of the present invention is the material wherein, as described above, polybutadiene with high Mooney viscosity is blended with polyisoprene having even higher Mooney viscosity and thus while maintaining a high impact resilience, its workability, processability, anti-cold flow property are improved and thus the concept is essentially different from the aforesaid prior arts.

EXAMPLES

The present invention is described in reference to the Examples. However, the present invention is not restricted to these Examples.

Examples 1 to 2 and Comparative Examples 1 to 5

Rubber compositions having the formulating ratio shown in Tables 1 and 2 were prepared and then press-molded at 150° C. for 30 minutes to form solid cores used for two-piece solid golf balls having an average diameter of 38.4 mm. The solid cores were covered with a cover to obtain two-piece solid golf balls having an outer diameter of 42.7 mm.

The cover was made of the blend of two ionomer resins (i.e. Himilan 1605 (tradename) and Himilan 1705 (tradename) manufactured by DUPONT-MITSU POLYCHEMICALS CO., LTD.) at a weight ratio of 50:50, containing 2 wt % of titanium oxide ($TiO_2$). Table 1 shows the composition of Examples 1 and 2 and Comparative Examples 1 and 2, and Table 2 shows the composition of Comparative Examples 3, 4 and 5. The numbers represent amounts of formulated materials in Tables 1 and 2 based on weight parts.

The Mooney viscosities of the rubbers in Tables 1 and 2 are those at $ML_{1+4}$(100° C.) and the polybutadiene and polyisoprene used are as follows:

Polybutadiene (Mooney viscosity 60):

Prototype polybutadiene manufactured by Japan Synthetic Rubber Co. (a product obtained by laboratory synthesis using nickel-based catalyst, the method of polymerization employed is the same as that for JSR BR11 and average molecular weight is $15 \times 10^4$).

Polybutadiene (Mooney viscosity 43):

JSR BRO1 (tradename) manufactured by Japan Synthetic Rubber Co.

Polyisoprene (Mooney viscosity 82):

IR-2200 (tradename) manufactured by Nippon Zeon Co.

Preparation of rubber composition was executed by kneading the components with a kneader and the rubber composition obtained was extruded in rod form by an extruder, the extruded rod product was cut into plugs. The plugs thus obtained were dipped in a solution of anti-sticking agent, dried and storaged at 26° C. for 24 hrs. and placed in a metal mold for press-molding.

A die of the extruder used in the extrusion was an elliptical one having a length of 35 mm and a width of 15 mm. Since the rubber composition shrunk in an extrusion direction at the point where it left the die, the plugs obtained had an elliptical shape of 50 mm in length, 28 mm in width and 27 mm in thickness. Since the plugs had residual orientation in the extrusion direction, the dimension of the core after vulcanization came to be different depending on the direction of orientation given to the plugs at the time of vulcanization and in the case of the rubber composition of inferior extrusion processability, the difference in sphericity of the core varied greatly.

The results of investigation of the roll workability, surface texture of extruded piece (conditions of the surface of extruded product) and anti-cold flow property during storage of the plug are shown in Table 3 and 4. The evaluation standard of the roll workability, extruded surface texture of extruded product and anti-cold flow property is as follows:

Evaluation Standard of Roll Workability

Excellent: The product can be rolled with easiness and cutting to size is easy.

Good: Ordinary roll work is possible.

Fairly good: Bagging or sticking to the roll occurs and operation is difficult.

Poor: Bagging occurs and the composition does not attach on the roller or adversely sticks to the roller, which makes it difficult to cut off and feed again between the rollers.

Evaluation Standard of Surface Texture of Extruded Product

Excellent: Surface texture of the plugs after extrusion is smooth.

Good: Surface texture of the plug after extrusion is nearly smooth.

Fairly good: Surface of the plug after extrusion is slightly rough.

Poor: The surface of the plug after extrusion indicates severe indentation just like a pinecone.

Anti-Cold Flow Property

Excellent: No deformation when left for 24 hrs.

Good: Some deformation when left for 24 hrs. but presenting no problem for being set into the metal mold.

Fairly good: Deformation occurs when left for 24 hrs. and the plug can not be set in the metal mold unless pushed into it by force.

Poor: When left for 24 hrs., the plug sticks to the iron plate on which it was placed and can not be removed.

Tables 3 and 4 indicate the results of evaluation of core sphericity, core hardness, ball weight, initial speed of ball, distance of carry and total distance. The method of measurement of these factors are as follows:

Core Sphericity:

A size of the core is measured both in a direction of an orientation direction of the rubber composition and in a direction perpendicular to the orientation direction, which are along a parting live of the core (a parting live of upper and lower molds). The difference between the both directions in millimeter is described in the tables.

Core Compression:

A difference of deformation at the time when an initial load of 10 kg is applied and at the time when an ultimate load of 130 kg is applied is measured. When the deformation amount is in 2 to 4 mm, the core compression is appropriate and if it is smaller, the core is too hard and if it is larger, the core is too soft.

Initial velocity of Ball:

Using a swing robot made by True Temper Corp., a ball is hit by No. 1 Wood at a head speed of 45 m/sec and its initial velocity is measured.

Durability of Ball:

Using a swing robot of True Temper Corp., a ball is hit repeatedly by No. 1 Wood at a head speed of 45 m/sec. and the number of repetition of hitting until crack generates is counted and durability of ball is expressed by an index of such count as against the count of hitting in Example 1, which is deemed 100.

Flying Distance:

Using a swing robot made by True Temper Corp., a ball is hit by No. 1 Wood at a head speed of 45 m/sec. and the distance up to a point where the ball falls is deemed carry and total distance until the ball stops is deemed total distance.

TABLE 1

|  | Ex. 1 | Ex. 2 | Comp. Ex. 1 | Comp. Ex. 2 |
|---|---|---|---|---|
| Polybutadiene (Mooney viscosity 60) | 90 | 78 | — | 100 |
| Polybutadiene (Mooney viscosity 43) | — | — | 100 | — |
| Polyisoprene (Mooney viscosity 82) | 10 | 22 | — | — |
| Zinc acrylate | 35 | 35 | 35 | 35 |
| Zinc oxide | 22 | 22 | 22 | 22 |
| Dicumyl peroxide | 2 | 2 | 2 | 2 |
| Antioxidant | 0.5 | 0.5 | 0.5 | 0.5 |
| Natural rubber (Mooney viscosity 50) | — | — | — | — |

TABLE 2

|  | Comp. Ex. 3 | Comp. Ex. 4 | Comp. Ex. 5 |
|---|---|---|---|
| Polybutadiene (Mooney viscosity 60) | — | 50 | 90 |
| Polybutadiene (Mooney viscosity 43) | 90 | — | — |
| Polyisoprene (Mooney viscosity 82) | 10 | 50 | — |
| Zinc acrylate | 35 | 35 | 35 |
| Zinc oxide | 22 | 22 | 22 |
| Dicumyl peroxide | 2 | 2 | 2 |
| Antioxidant | 0.5 | 0.5 | 0.5 |
| Natural rubber (Mooney viscosity 50) | — | — | 10 |

TABLE 3

|  | Example 1 | Example 2 | Comp. Ex. 1 | Comp. Ex. 2 |
|---|---|---|---|---|
| Roll workability | Excellent | Excellent | Excellent | Good–Fairly good |
| Extruded surface | Excellent | Excellent | Excellent | Fairly good |
| Anti-cold flow property | Excellent | Excellent | Fairly good–Poor | Good–Fairly good |
| Difference in core sphericity (mm) | 0.095 | 0.098 | 0.108 | 0.107 |
| Core compression | Suitable | Suitable | Suitable | Suitable |
| Ball weight (g) | 45.5 | 45.3 | 45.4 | 45.5 |
| Initial velocity (m/s) | 65.2 | 65.0 | 64.6 | 65.3 |
| Durability of ball | 100 | 102 | 101 | 90 |
| Flying distance |  |  |  |  |
| Carry (m) | 202 | 201 | 197 | 203 |
| Total (m) | 225 | 224 | 216 | 225 |

TABLE 4

|  | Comp. Ex. 3 | Comp. Ex. 4 | Comp. Ex. 5 |
|---|---|---|---|
| Roll workability | Excellent | Good | Fairly good |
| Extruded surface | Excellent | Excellent | Good |
| Anti-cold flow property | Fairly good–Poor | Excellent | Fairly good |
| Difference in core sphericity (mm) | 0.097 | 0.095 | 0.093 |
| Core hardness | Suitable | Soft | Suitable |
| Ball weight (g) | 45.4 | 45.3 | 45.5 |
| Initial velocity (m/s) | 64.4 | 62.7 | 64.2 |
| Durability of ball | 102 | 73 | 93 |
| Flying distance |  |  |  |
| Carry (m) | 196 | 190 | 199 |
| Total (m) | 213 | 209 | 217 |

As is apparent from Table 3, Examples 1 to 3 indicate satisfactory results for all factors (i.e. roll workability, surface texture of extruded piece, anti-cold flow property) and initial speed and flying distance of ball, and flying characteristics are excellent. Durability is comparable to the conventional products (Comparative Example 1) and shows no substantial decrease of durability.

Comparative Example 1 corresponds to the conventional product wherein polybutadiene of Low Mooney viscosity is used independently for the rubber component, but it indicates lower initial speed of ball, shorter flying distance, inferior anti-cold flow property and the plug tends to fail to maintain the original shape, thus making the workability in press-molding inferior.

In Comparative Example 2, since polybutadiene having higher Mooney viscosity is independently used as the rubber component, roll workability and surface texture of extrude piece are inferior as shown in Table 3. This may cause inclusion of anti-sticking agent during press-molding process and provides the deterioration of durability.

In Comparative Example 3, since polybutadiene having lower Mooney viscosity is used as the rubber component, the initial ball velocity and flying distance are smaller as shown in Table 4, like Comparative Example 1 and anti-cold flow property has neither been improved sufficiently.

In Comparative Example 4, since a large amount of polyisoprene is used as rubber components, compression is smaller and as the result, initial velocity and flying distance are smaller.

Comparative Example 5 was an example where natural rubber (natural polyisoprene) was blended, but normally, natural rubber has a Mooney viscosity of unmeasurably high and workability is so bad that it can not be used as it is and it is hard to be blended with other rubber, thus making it impossible to use. It is therefore customary to knead it by adding a softening agent etc. to reduce Mooney viscosity [$ML_{1+4}$(100° C.)] to about 50 to 70 to reduce molecular weight and use.

Therefore in Comparative Example 5, 0.5 wt part of Noctizer SK (tradename of a softening agent manufactured by Ouchi Shinko Chemical Industry Co.) was added to 100 wt parts of natural rubber (RSS No.3), and mixed for 10 minutes by a banbury mixer to obtain a mixture having a Mooney viscosity [$ML_{1+4}$(100° C.)] of 50, because of enhancing blending properties with polybutadiene. However, natural rubber tends to loose its molecular weight as it is blended with other chemicals and therefore it produced the same results as the case when polyisoprene having very low molecular weight was blended. As it is evident in the results shown in Table 4 above, it produced higher sticking properties to the rollers during roll work and workability deteriorated. Anti-cold flow property also became inferior and both initial speed and flying distance became undesirable.

As described above, in the present invention, by blending the polybutadiene having higher Mooney viscosity with polyisoprene having higher Mooney viscosity and using such blend as the rubber component, it has been possible to significantly improve processability, workability and anti-cold flow property while maintaining high impact resilience inherent to polybutadiene having higher Mooney viscosity.

That is, in the present invention by using a combination of the polybutadiene (1) and the polyisoprene (2), it is made possible to obtain a good mixture of rubber component at the time of preparation of rubber composition, improve roll workability accompanied by polybutadiene having higher Mooney viscosity and eliminate poor extrusion characteristics accompanied by polybutadiene having higher Mooney viscosity, thus improving workability at the time of extrusion. The present invention also improves smoothness of surface texture of the extruded piece, thereby preventing inclusion of foreign matters into the rubber composition at the time of press-molding and also improves anti-cold flow property inherent to polybutadiene. It is also made possible to prevent deformation of plug during storage the plug prior to press-molding, thus improving workability at the time of press-molding and improving initial velocity and flying distance of the golf ball in view of the high impact resilience of polybutadiene having higher Mooney viscosity.

What is claimed is:

1. A rubber composition for golf balls comprising a rubber component which is made from a mixture of:
   (1) 60 to 95 wt % of a polybutadiene containing at least more than 40% of cis-1,4 bond and having a Mooney viscosity [$ML_{1+4}$(100° C.)] of 50 to 70, obtained by using lanthanum rare earth-based catalyst, nickel-based catalyst or cobalt-based catalyst, or a mixture thereof with another polybutadiene obtained by using a catalyst other than the above mentioned one, and
   (2) 5 to 40 wt % of a polyisoprene containing at least more than 90% of cis-1,4 bond and a Mooney viscosity of 70 to 90.

2. A rubber composition for golf balls according to claim 1 wherein the polybutadiene has at least 80 % of cis-1,4-bond.

3. A rubber composition for golf balls according to claim 1 wherein the polybutadiene has a Mooney viscosity [$ML_{1+}$(100° C.)] of 55 to 65.

4. A rubber composition for golf balls, comprising:
   (a) a rubber component which is made from a mixture of:
     (1) 60 to 95 wt % of a polybutadiene containing at least more than 40% of cis-1,4 bond and having a Mooney viscosity [$ML_{1+4}$(100° C.)] of 50 to 70, obtained by using lanthanum rare earth-based catalyst, nickel-based catalyst or cobalt-based catalyst, or a mixture thereof with another polybutadiene obtained by using a catalyst other than the above mentioned one, and
     (2) 5 to 40 wt % of a polyisoprene containing at least more than 90% of cis-1,4 bond and a Mooney viscosity of 70 to 90,
   (b) a crosslinking agent which is either a metal salt of an α,β-ethylenically unsaturated carboxylic acid or a combination of an α,β-ethylenically unsaturated carboxylic acid and a metal oxide,
   (c) a filler, and
   (d) a peroxide initiator.

5. A rubber composition for golf balls according to claim 4 wherein the peroxide initiator is dicumyl peroxide.

6. A one-piece solid golf ball obtained by vulcanizing the rubber composition according to claim 1 or 4 in a mold.

7. A solid golf ball having multi-layered construction, wherein a rubber portion thereof is obtained by vulcanizing the rubber composition according to claim 1 or 4.

8. A two-piece solid golf ball comprising a solid core and a cover covering said solid core, wherein said solid core is obtained by vulcanizing the rubber composition according to claim 1 or 4.

9. A thread-wound golf ball comprising a solid center, a thread-wound layer on said solid center and a cover covering the thread-wound layer, wherein said solid center is obtained by vulcanizing the rubber composition according to claim 1 or 4.

* * * * *